US012446175B2

(12) United States Patent
Caplow-Munro et al.

(10) Patent No.: US 12,446,175 B2
(45) Date of Patent: Oct. 14, 2025

(54) LAMINATE REAR COVER WITH STIFFENED FUNCTIONAL LAYER

(71) Applicant: Microsoft Technology Licensing, LLC, Redmond, WA (US)

(72) Inventors: Devin S J Caplow-Munro, Seattle, WA (US); Apoorva Sharma, Sammamish, WA (US); Charbel Khawand, Sammamish, WA (US); Gary Russell McClary, Palisade, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 18/198,045

(22) Filed: May 16, 2023

(65) Prior Publication Data

US 2024/0389253 A1    Nov. 21, 2024

(51) Int. Cl.
*H05K 5/03* (2006.01)
*H01Q 1/24* (2006.01)
*H04M 1/18* (2006.01)
*H05K 5/04* (2006.01)

(52) U.S. Cl.
CPC .............. *H05K 5/03* (2013.01); *H04M 1/185* (2013.01); *H05K 5/04* (2013.01); *H01Q 1/243* (2013.01)

(58) Field of Classification Search
CPC .... H01Q 1/243; H04M 1/0283; H04M 1/185; H05K 5/03; H05K 5/04
See application file for complete search history.

(56) References Cited

U.S. PATENT DOCUMENTS 9,105,967 B2 * 8/2015 Park ....................... H02J 50/10
9,520,639 B2 * 12/2016 Li ........................... H05B 45/60
10,177,803 B2 * 1/2019 Kim ..................... H05K 9/0081
(Continued)

FOREIGN PATENT DOCUMENTS

CN        111180875 A      5/2020
KR      20140004336 A      1/2014
(Continued)

OTHER PUBLICATIONS

International Search Report and Written Opinion received for PCT Application No. PCT/US2024/028115, Sep. 3, 2024, 16 pages.

*Primary Examiner* — James Wu
(74) *Attorney, Agent, or Firm* — Ray Quinney & Nebeker P.C.; Paul N. Taylor

(57) ABSTRACT

The disclosed technology is generally directed to a mobile device with an active rear cover. In one example of the technology, an apparatus comprises a mobile device, including: a chassis that has a recessed region, electronic components disposed in the chassis, and, embedded in the recessed region, a rear cover. The rear cover is removable. The rear cover has flexural rigidity. The rear cover includes: a cover layer that is RF-transparent and a functional layer that is disposed beneath the cover layer. The functional layer includes a plurality of electrical connections. The functional layer is laminated to the cover layer. At least one electrical connection of the plurality of electrical connections is connected to the electronic components disposed in the chassis. The functional layer is structured such that inclusion of the functional layer in the rear cover provides a majority of the flexural rigidity of the rear cover.

20 Claims, 5 Drawing Sheets

(56) References Cited

U.S. PATENT DOCUMENTS

| | | | |
|---|---|---|---|
| 2013/0267170 A1 | 10/2013 | Chong et al. | |
| 2014/0125551 A1 | 5/2014 | Chen et al. | |
| 2015/0109173 A1 | 4/2015 | Chen | |
| 2017/0300736 A1* | 10/2017 | Song | G06V 40/1312 |
| 2021/0029234 A1* | 1/2021 | Gao | G02B 5/26 |

FOREIGN PATENT DOCUMENTS

| | | |
|---|---|---|
| WO | 2017152622 A1 | 9/2017 |
| WO | 2021176897 A1 | 9/2021 |

\* cited by examiner

LAMINATE REAR COVER WITH STIFFENED FUNCTIONAL LAYER

BACKGROUND

In mobile devices with removable rear covers, glass is typically a desirable material for cosmetic and structural reasons.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to a mobile device with an active rear cover. In one example of the technology, an apparatus comprises a mobile device, including: a chassis that has a recessed region, electronic components disposed in the chassis, and, embedded in the recessed region, a rear cover. The rear cover is removable. The rear cover has flexural rigidity. The rear cover includes: a cover layer that is RF-transparent and a functional layer that is disposed beneath the cover layer. The functional layer includes a plurality of electrical connections. The functional layer is laminated to the cover layer. At least one electrical connection of the plurality of electrical connections is connected to the electronic components disposed in the chassis. The functional layer is structured such that inclusion of the functional layer in the rear cover provides a majority of the flexural rigidity of the rear cover.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

A mobile device has a removable active rear cover. The rear cover is a laminated rear cover that includes a functional layer that is laminated to a cover layer. Conventional rear covers have a relatively thick glass outer layer, such as 400-micron thick glass, 700-micron thick glass, or the like. Such relatively thick glass is conventionally used to reduce the likelihood of breaking the rear cover in assembly and in use. The structure of the laminated rear cover allows the outer layer of the rear cover to be composed of a plastic-based material or a very thin glass cover. Rather than only acting as a cover, the rear cover is an active cover that provides active functionality, such as antenna functionality, via the functional layer. The functional layer is a dedicated layer that includes antennas or radiofrequency (RF) components, and also includes one or more inner stiffener sub-layers. The functional layer provides antenna or RF functionality to the rear cover while also increasing the flexural rigidity of the rear cover.

Illustrative Systems

Figure 1:
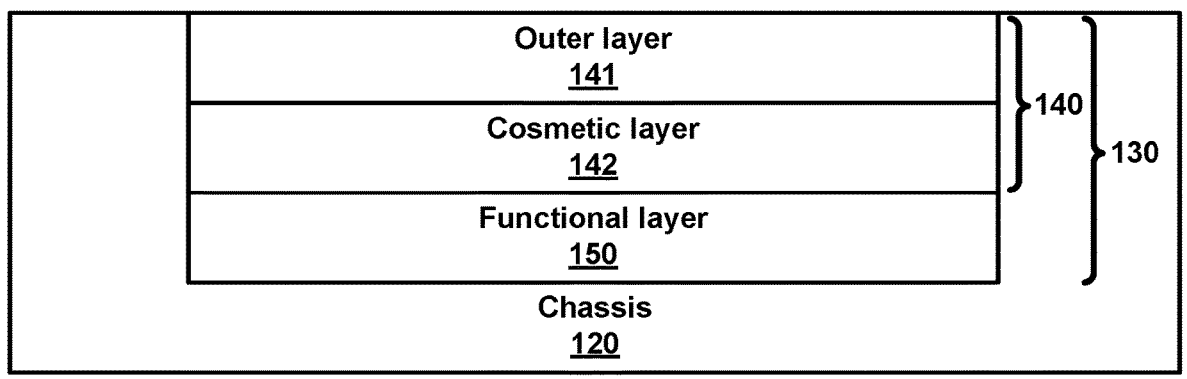
FIG. 1 shows a side view of an example mobile device that includes an active rear cover.

FIG. 1 shows a side view of an example of a mobile device (100). FIG. 1 and the corresponding description of FIG. 1 in the specification illustrate an example system for illustrative purposes that does not limit the scope of the disclosure. Mobile device 100 is described as follows in accordance with some examples.

Mobile device 100 includes chassis 120 and rear cover 130. Rear cover is an active rear cover for a mobile device. Rear cover 130 includes cover layer 140 and functional layer 150. Cover layer 140 includes outer layer 141 and cosmetic layer 142.

Chassis 120 has a recessed region. In some examples, chassis 120 is composed of aluminum or another suitable metal. Rear cover 130 is a removable rear cover that is embedded in the recessed region of chassis 120. Functional layer 150 is laminated to cover layer 140. Cover layer 140 is RF-transparent. The term "RF-transparent" refers to transparency to RF signals. A material that is "optically transparent" is a material that allows light to pass through the material without appreciable scattering of light. Materials that do not transmit light are "opaque." A material that is "RF-transparent" is a material that allows RF signals to pass through the material with relatively low attenuation. An RF transparency of over 75% is considered to be a high degree of RF-transparency.

Outer layer 141 is the outer layer of rear cover 130 and is composed of clear, scratch-resistant, RF-transparent material. For instance, in some examples, outer layer 141 is a thermoformed polycarbonate plastic outer layer with a hardened acrylic coating. In some examples, outer layer 141 is composed of a Glastic® material. In other examples, outer layer 141 is composed of other suitable materials. In some examples, cosmetic layer 142 is RF-transparent and opaque and is disposed beneath outer layer 141. For instance, in some examples, cosmetic layer 142 consists of consisting of multiple inks, non-conductive physical vapor deposition (PVD) coating, and, optionally, a polyimide carrier. Cosmetic layer 142 hides the functional components of mobile device 100.

Functional layer 150 includes stiffener components and functional components, where the functional components are antenna components or signal-carrying components. In some examples, the functional components include antenna components that include connections to electronic components that are housed in chassis 120. In some examples, the functional components include electronic connections that route electrical connections from one portion of mobile device 100 to another portion of mobile device 100 through functional layer 140, such as from one circuit board in mobile device 100 that is housed in chassis 120 to another circuit board in mobile device 100 that is housed in chassis 120, where the electrical connections carry both signal and power.

Mobile device 100 further includes various electronic components housed/disposed within chassis 120 that enable mobile device 100 to operate as a mobile device, such as components discussed in further detail in FIG. 4 below. Some of the functional components in functional layer 150 include connections to electronic components housed within chassis 120.

One or more stiffening layers in functional layer 150 increase the structural rigidity of rear cover 130. In some examples, the stiffeners in functional layer 150 include one or more stainless-steel stiffening layers. For instance, in some examples, functional layer 150 includes two or more antenna layers and two stainless-steel layers, all held together with strong and stiff adhesive such as epoxy, a thermoplastic adhesive, or another suitable adhesive. In other examples, the stiffeners in functional layer 150 may be one or more stiffening layers composed of a metal other than stainless steel or may provide stiffening in another suitable manner. For instance, in some examples, functional layer 150 includes exactly one layer that is a hard substrate such as a printed circuit board (PCB) that itself acts as a stiffener.

Due to the stiffening components in functional layer 150, the inclusion of functional layer 150 provides a majority of the flexural rigidity of rear cover. In this way, functional layer 150 covers the majority of the mechanical stress to which rear cover 130 is subjected when rear cover 130 is under load. In a typical rear cover of a mobile device, the outer cover lens is the load-bearing component of the rear cover. However, in rear cover 130, functional layer 150 shares the structural load, including drops, touch forces, and the like. An "outer cover lens" is a transparent outer layer covering the rear of a device, conventionally composed of relatively thick coverglass, that provides protection, ruggedization, impact resistance, and resistance to abrasions, scratches, and other forms of damage to the device.

Rear cover 130 is a laminated removable rear cover that has less overall thickness than a typical rear cover by combining structural and functional components in functional layer 150. Rear cover 130 is an active rear cover that integrates functional components such as antenna components or RF components. Rear cover 130 may have improved antenna performance or improved RF performance due to the relatively low amount of attenuating material components between the antenna components or RF components in functional layer 150 and the outside of mobile device 100.

In a typical RF layout, the antenna components typically must be at tall points on the device, which constrains the available area available for the RF layout. By using a dedicated functional layer 150 for the assembly or RF components or for antennas and by using a stiffener inside functional layer 150, rear cover 130 increases the area available for antenna layout or RF layout. The presence of stiffening components in functional layer 150 allows antennas or RF components to be present outside of the normal geometry of mobile device 100. The lamination of functional layer to 150 to cover layer 140 provides an increased ease in manufacturability of mobile device 100. The construction of rear cover 130 also provides a stable environment during assembly and allows less assembly tolerances.

Figure 2A:
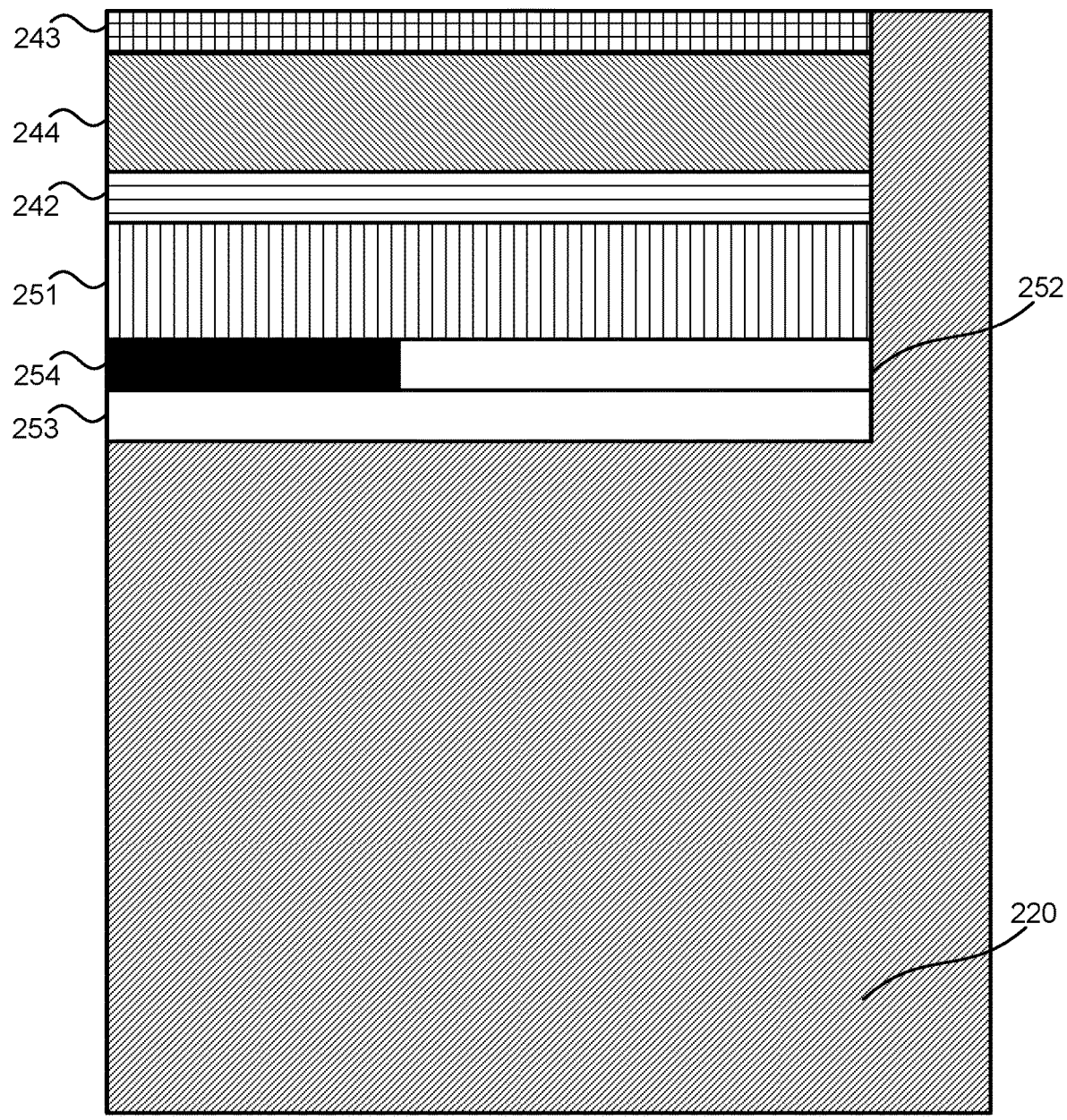
FIG. 2A shows a side cutaway view of an example of the mobile device of FIG. 1.
Figure 2B:
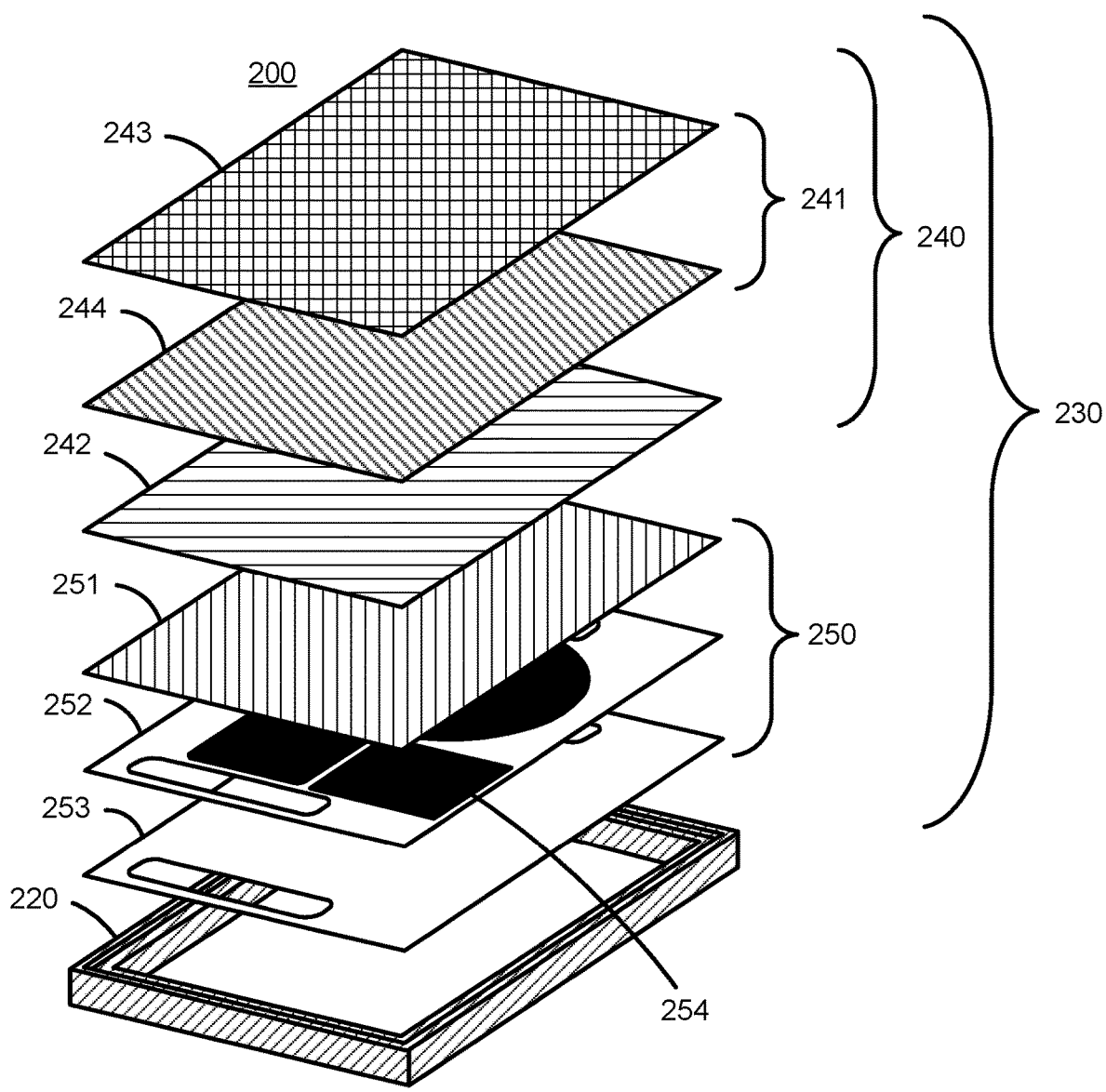
FIG. 2B shows an exploded view of an example of mobile device of FIG. 2A.

FIG. 2A shows a side cutaway view of an example of mobile device 200. FIG. 2B shows an exploded view of mobile device 200. Mobile device 200 may be an example of mobile device 100 of FIG. 1. In various examples, mobile device 200 is a tablet, mobile phone, or other suitable type of mobile device. Mobile device 200 includes chassis 220 and rear cover 230. Rear cover 230 includes cover layer 240 and functional layer 250. Cover layer 240 includes outer layer 241 and cosmetic layer 242. Outer layer 241 includes polymethyl methacrylate (PMMA) layer 243 and polycarbonate layer 244. Functional layer 250 includes antenna layer 251, stainless-steel layer 252, and stainless-steel layer 253. Stainless-steel layer 252 is integrated with ferrite 254.

In some examples, chassis 220 is an aluminum midframe for mobile device 200. Rear cover 230 is bonded into chassis 220 about the entire rim or perimeter of rear cover 230. Mobile device 200 further includes various electronic components housed within chassis 220 that enable mobile device 200 to operate as a mobile device, such as components discussed in further detail in FIG. 4 below. Chassis 220 has a recessed region. Rear cover 230 is a removable rear cover that is embedded in the recessed region of chassis 220. Functional layer 250 is laminated to cover layer 240. In various examples, various different adhesives may be used to laminate functional layer 250 to cover layer 240. For instance, epoxy, a thermoplastic adhesive, or another suitable adhesive may be used in various examples.

Functional layer 250 is composed of both stiffener components and antenna components. Stainless-steel layer 252 and stainless-steel layer 253 are both stiffening layers. Stainless-steel layer 252 is integrated with ferrite 254 to aid the functionality of RF components in antenna layer 251. Antenna layer 251 includes functional antenna components for mobile device 200. Stainless-steel layer 252 is laminated on top of stainless-steel layer 253 using a very thin adhesive. Antenna layer 251 is laminated on top of stainless-steel layer 252.

Cosmetic layer 242 is a thin, RF-transparent, opaque layer that hides (i.e., visually obscures) the functional components of mobile device 200. Outer layer 241 is a clear, scratch-resistant, RF-transparent dielectric layer that acts as an outer cover lens. Polycarbonate layer 244 forms most of outer layer 241. PMMA layer 243 provides scratch resistance to polycarbonate layer 244. In some examples, each of the layers in laminated rear cover 230 is held together with a strong and stiff adhesive such as epoxy, a thermoplastic adhesive, or another suitable type of adhesive. In some examples, stainless-steel layer 353 is electrical connected to chassis 220 in order to create a Faraday cage around chassis 220. Some examples of rear cover 230 further include a conductive foam material around the perimeter of rear cover 230, at least around antennas in antenna layer 251, connected to the ground of chassis 220, to act as an RF "fence."

Rear cover 230 is removable and modular. Rear cover 230 is not designed for removal during normal use, but can be removed for repair or other suitable reasons. When rear cover 230 is removed, the functional antenna components in rear cover 230 are removed along with rear cover 230. For this reason, removing rear cover 230, for repair or some other reason, does not introduce the risk of a contaminant being introduced between the antenna and the rear cover. Conventionally, when a rear cover is removed from a mobile device for repair, a contaminant may be introduced between the rear cover and the antenna, or a misalignment or gap may occur between the antenna and the rear cover. However, in mobile device 200, because antenna layer 251 is an integrated part of laminated rear cover 230, there is no risk of such a contaminant, gap, or misalignment. This may also help ensure that mobile device 200 complies with any applicable customer replaceable unit/field replaceable unit (FRU/CRU) requirements.

Figure 3:
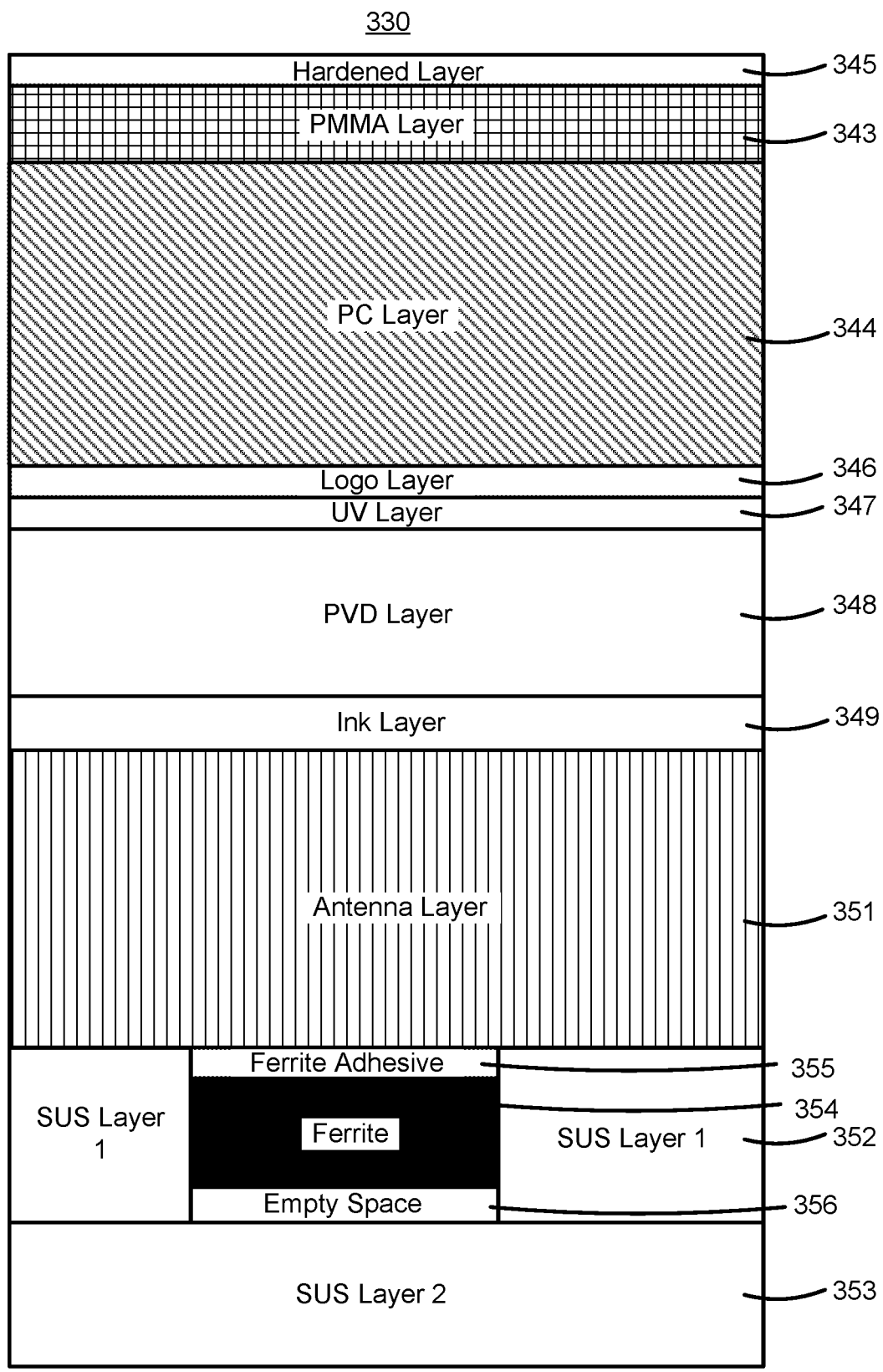
FIG. 3 shows a side view of an example of a rear cover of the mobile device of FIG. 1 or FIG. 2.

FIG. 3 shows a side view of an example of rear cover 330. Rear cover 330 may be used as an example of rear cover 230 of mobile device 200 of FIG. 2A and FIG. 2B. FIG. 3 and the following discussion of rear cover 330 show and discuss a particular example of rear cover 330 with specific layers, specific materials, and specific thicknesses discussed and shown by way of example for illustrative purposes. However, many suitable variations may also be used in various examples. Rear cover 330 includes hardened layer 345, PMMA layer 343, PC (polycarbonate) layer 344, logo layer 346, ultraviolet (UV) layer 347, PVD layer 348, ink layer 349, antenna layer 351, stainless-steel (SUS) layer 352, SUS layer 353, ferrite adhesive 355, ferrite 354, and empty space 356.

Rear cover 330 is an active rear cover with antenna components integrated directly into rear cover 330. Antenna layer 351, stainless-steel layer 352, stainless-steel layer 353, ferrite adhesive 355, ferrite 354, and empty space 356 together make up a functional layer that combines stiffening components and antenna components. Antenna layer 351 includes antenna components, and stainless-steel layers 352 and 353 are stiffening layers/components that increase the flexural rigidity of rear cover 330. Antenna layer 351 is composed of a flexible printed circuit (FPC) board stack that includes two or more antenna layers. In some examples, antenna layer 351 includes one antenna FPC that integrates both Qi and near-field communication (NFC) antennas, and another antenna FPC that includes an ultra-wideband (UWB) antenna. Ferrite 354 is disposed within/integrated with stainless-steel layer 352, and ferrite 354 aids the functionality of RF components in antenna layer 351 by enhancing wireless charging magnetic field performance of antenna components in antenna layer 351. Ferrite adhesive 355 adheres ferrite 354 to stainless steel layer 352.

Stainless-steel layers 352 and 353 are relatively uniform sheet metal layers of 304-grade stainless steel. Stainless steel layer 352 has cutouts for connection to antenna layer 351. Cutouts in stainless-steel layers 352 and 353 allow connections such as a pogo pin or a flex tail to route from antenna layer 351 through stainless-steel layers 352 and 353 to other parts of the mobile device for which rear cover 330 is a rear cover. Stainless-steel layers 352 and 353 also act as a grounding layer between the antennas in antenna layer 351 and internal components of the mobile device for which rear cover 330 is a rear cover.

Stainless-steel layer 352 is interleaved with ferrite 354 and has cutouts in the middle of stainless-steel layer 352 where the antennas in antenna layer 351 are located, with ferrite 354 placed into those cutouts. Empty space 356 provides tolerance that prevents there from being a bulge in rear cover 330. In the example illustrated in FIG. 3, antenna layer 351 is 400 microns thick, stainless-steel layer 352 is 100 microns thick, stainless-steel layer 353 is 100 microns thick, ferrite adhesive 355 is 10 microns thick, ferrite 354 is 80 microns thick, and empty space 356 is 10 microns thick.

Logo layer 346, UV layer 347, PVD layer 348, and ink layer 349 together make up a cosmetic layer that is a thin, RF-transparent, opaque layer that hides the functional components beneath the cosmetic layer. In various examples, logo layer 346 is formed by screen printing, laser printing, or another suitable process. In some examples, logo layer 346 includes metallic ink to create a shiny logo. UV layer 347 is formed by a UV printing process that applies a UV cure ink in specific locations using UV in order to print text.

PVD layer 348 is formed by vapored metallic vapor deposition to apply a very thin layer of metallic particles to create a metallic shine and augment the appearance of ink layer 349. Nonconductive vacuum metal plating (NCVM) is used for PVD layer 348 so that PVD layer 348 is nonconductive and RF-transparent. Ink layer 349 is an opaque coating of ink that is painted, rolled, or printed. In the example illustrated in FIG. 3, logo layer 346 is 2 microns thick, UV layer 347 is 7 microns thick, PVD layer 348 is 30 microns thick, and ink layer 349 is 20 microns thick.

Hardened layer 345, PMMA layer 343, and polycarbonate layer 344 together make up an outer cover lens for rear cover 330 that is clear, scratch-resistant, and RF-transparent. Polycarbonate layer 344 is a polycarbonate sheet that forms most of cover layer 340. PMMA layer 343 and hardened layer 345 are two different coatings that each provide scratch resistance to polycarbonate layer 344. Hardened layer 345 is a spray-on coating that is cured to become a very hard thin layer for scratch resistance. Hardened layer 345, PMMA layer 343, polycarbonate layer 344, logo layer 346, UV layer 347, PVD layer 348, and ink layer 349 together act as a plastic-based cover layer that, due to being backed by the increased flexural rigidity provided by the functional layer comprising antenna layer 351, stainless-steel layer 352, stainless-steel layer 351, have a substantial functional parity with a thick glass-based cover in terms of stiffness, but which is less expensive than glass, has better antenna performance that a glass-based rear cover due to less attenuating material compared to glass, and that has better shatter resistance than a glass-based cover. In the example illustrated in FIG. 3, hardened layer 345 is 5 microns thick, PMMA layer 343 is 50 microns thick, and polycarbonate layer 344 is 250 microns thick.

Illustrative Computing Device

Figure 4:
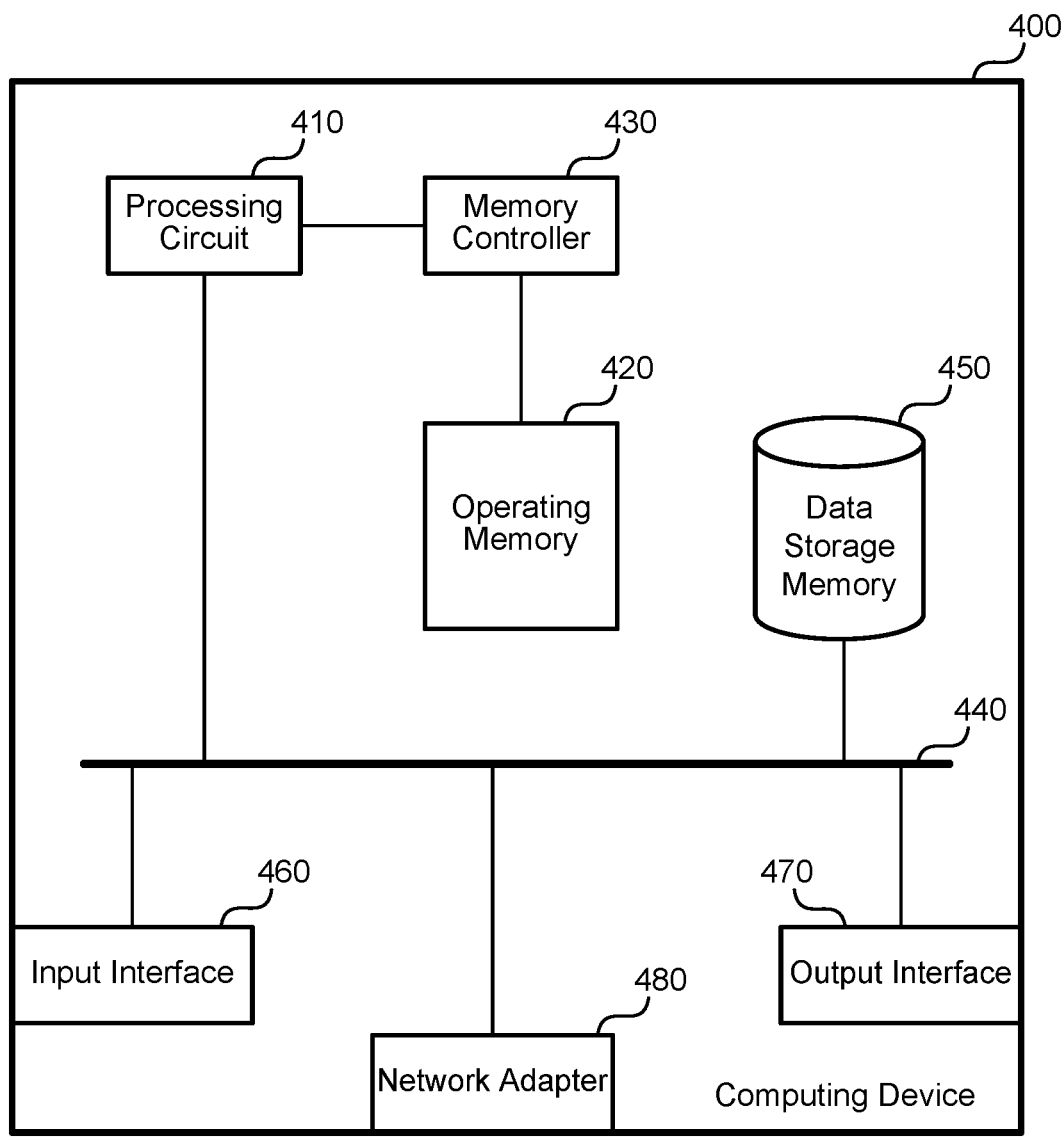
FIG. 4 is a block diagram illustrating one example of a suitable computing device, according to aspects of the disclosed technology.

FIG. 4 is a diagram illustrating one example of computing device 400 in which aspects of the technology may be practiced. Computing device 400 may be virtually any type of general- or specific-purpose computing device. For example, computing device 400 may be a user device such as a desktop computer, a laptop computer, a tablet computer, a display device, a camera, a printer, or a smartphone. Likewise, computing device 400 may also be a server device such as an application server computer, a virtual computing host computer, or a file server computer. In some examples, computing device 400 is a mobile device that is an example of mobile device 100 of FIG. 1 or mobile device 200 of FIG. 2. In some examples, the components illustrated in FIG. 4 are contained within chassis 120 of device mobile device 100 of FIG. 2 or chassis 220 device 200 of FIG. 2. As illustrated in FIG. 4, computing device 400 may include processing circuit 410, operating memory 420, memory controller 430, bus 440, data storage memory 450, input interface 460, output interface 470, and network adapter 480. Each of these afore-listed components of computing device 400 includes at least one hardware element.

Computing device 400 includes at least one processing circuit 410 configured to execute instructions, such as instructions for implementing the herein-described workloads, processes, and/or technology. Processing circuit 410 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 420 during run-time of computing device 400. Operating memory 420 may also include any of a variety of data storage devices/components, such as volatile memories, semi-volatile memories, random access memories, static memories, caches, buffers, and/or other media used to store run-time information. In one example, operating memory 420 does not retain information when computing device 400 is powered off. Rather, computing device 400 may be configured to transfer instructions from a non-volatile data storage component (e.g., data storage component 450) to operating memory 420 as part of a booting or other loading process. In some examples, other forms of execution may be employed, such as execution directly from data storage component 450, e.g., eXecute In Place (XIP).

Operating memory 420 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 410 via memory controller 430 in channels. One example of computing device 400 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above discussion, operating memory 420 specifically does not include or encompass communications media, any communications medium, or any signals per se.

Memory controller 430 is configured to interface processing circuit 410 to operating memory 420. For example, memory controller 430 may be configured to interface commands, addresses, and data between operating memory 420 and processing circuit 410. Memory controller 430 may also be configured to abstract or otherwise manage certain aspects of memory management from or for processing circuit 410. Although memory controller 430 is illustrated as a single memory controller separate from processing circuit 410, in other examples, multiple memory controllers may be employed, memory controller(s) may be integrated with operating memory 420, and/or the like. Further, memory controller(s) may be integrated into processing circuit 410. These and other variations are possible.

In computing device 400, data storage memory 450, input interface 460, output interface 470, and network adapter 480 are interfaced to processing circuit 410 by bus 440. Although FIG. 4 illustrates bus 440 as a single passive bus, other configurations, such as a collection of buses, a collection of point-to-point links, an input/output controller, a bridge, other interface circuitry, and/or any collection thereof may also be suitably employed for interfacing data storage memory 450, input interface 460, output interface 470, and/or network adapter 480 to processing circuit 410.

In computing device 400, data storage memory 450 is employed for long-term non-volatile data storage. Data storage memory 450 may include any of a variety of non-volatile data storage devices/components, such as non-volatile memories, disks, disk drives, hard drives, solid-state drives, and/or any other media that can be used for the non-volatile storage of information. However, data storage memory 450 specifically does not include or encompass communications media, any communications medium, or any signals per se. In contrast to operating memory 420, data storage memory 450 is employed by computing device 400 for non-volatile long-term data storage, instead of for run-time data storage.

Also, computing device 400 may include or be coupled to any type of processor-readable media such as processor-readable storage media (e.g., operating memory 420 and data storage memory 450) and communication media (e.g., communication signals and radio waves). While the term processor-readable storage media includes operating memory 420 and data storage memory 450, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 400 also includes input interface 460, which may be configured to enable computing device 400 to receive input from users or from other devices. In addition, computing device 400 includes output interface 470, which may be configured to provide output from computing device 400. In one example, output interface 470 includes a frame buffer, graphics processor, graphics processor or accelerator, and is configured to render displays for presentation on a separate visual display device (such as a monitor, projector, virtual computing client computer, etc.). In another example, output interface 470 includes a visual display device and is configured to render and present displays for viewing. In yet another example, input interface 460 and/or output interface 470 may include a universal asynchronous receiver/transmitter (UART), a Serial Peripheral Interface (SPI), Inter-Integrated Circuit (I2C), a General-purpose input/output (GPIO), and/or the like. Moreover, input interface 460 and/or output interface 470 may include or be interfaced to any number or type of peripherals.

In the illustrated example, computing device 400 is configured to communicate with other computing devices or entities via network adapter 480. Network adapter 480 may include a wired network adapter, e.g., an Ethernet adapter, a Token Ring adapter, or a Digital Subscriber Line (DSL) adapter. Network adapter 480 may also include a wireless network adapter, for example, a Wi-Fi adapter, a Bluetooth adapter, a ZigBee adapter, a Long-Term Evolution (LTE) adapter, SigFox, LoRa, Powerline, or a 4G adapter.

Although computing device 400 is illustrated with certain components configured in a particular arrangement, these components and arrangements are merely one example of a computing device in which the technology may be employed. In other examples, data storage memory 450, input interface 460, output interface 470, or network adapter 480 may be directly coupled to processing circuit 410 or be coupled to processing circuit 410 via an input/output controller, a bridge, or other interface circuitry. Other variations of the technology are possible.

Some examples of computing device 400 include at least one memory (e.g., operating memory 420) having processor-executable code stored therein, and at least one processor (e.g., processing unit 410) that is adapted to execute the processor-executable code, wherein the processor-executable code includes processor-executable instructions that, in response to execution, enables computing device 400 to perform actions, where the actions may include, in some examples, actions for one or more processes described herein.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
    a mobile device, including:
        a chassis that has a recessed region;
        electronic components disposed in the chassis; and
        embedded in the recessed region, a rear cover, wherein the rear cover is removable, wherein the rear cover has flexural rigidity, and wherein the rear cover includes:
            a cover layer that is RF-transparent; and
            a functional layer that is disposed beneath the cover layer, wherein the functional layer includes a plurality of electrical connections, wherein the functional layer is laminated to the cover layer, wherein at least one electrical connection of the plurality of electrical connections is connected to the electronic components disposed in the chassis, and wherein the functional layer is structured such that inclusion of the functional layer in the rear cover provides a majority of the flexural rigidity of the rear cover.

2. The apparatus of claim 1, wherein the chassis is composed of metal.

3. The apparatus of claim 1, wherein the cover layer includes:
    an outer layer that is clear, scratch-resistant, and RF-transparent; and
    a cosmetic layer disposed beneath the outer layer, wherein the cosmetic layer is RF-transparent and opaque.

4. The apparatus of claim 1, wherein the functional layer includes at least a first antenna, and wherein at least one electrical connection of the plurality of electrical connections connects the first antenna to the electronic components disposed in the chassis.

5. The apparatus of claim 1, wherein the electronic components disposed in the chassis include at least a first region and a second region, and wherein the functional layer includes at least one electrical connection that is arranged to carry signal and power and that is arranged to providing routing through the rear cover from the first region to the second region.

6. The apparatus of claim 1, wherein the cover layer is an outer cover lens that does not include glass.

7. The apparatus of claim 1, wherein the cover layer is an outer cover lens that includes polycarbonate.

8. The apparatus of claim 1, wherein the rear cover is bonded to the chassis about an entire perimeter of the rear cover.

9. The apparatus of claim 1, wherein the functional layer includes a first antenna layer, a first stainless-steel stiffening layer, and a second stainless-steel stiffening layer.

10. The apparatus of claim 9, wherein the second stainless-steel stiffening layer is electrically connected to the chassis.

11. The apparatus of claim 9, wherein the rear cover further includes a conductive foam around a perimeter of the first antenna layer.

12. An apparatus, comprising:
    a mobile device, including:
        a chassis that has a recessed region;
        electronic components disposed in the chassis; and embedded in the recessed region, a rear cover, wherein the rear cover is laminated, wherein the rear cover is removable, wherein the rear cover has flexural rigidity, and wherein the rear cover includes:
- an outer layer that is clear, scratch-resistant, and RF-transparent;
- a cosmetic layer disposed beneath the outer layer that is RF-transparent and opaque; and
- a functional layer that is disposed beneath the cosmetic layer, wherein the functional layer includes a first antenna component and a first electrical connection between the antenna component and the electronic components disposed in the chassis, and wherein the functional layer is structured such that inclusion of the functional layer in the rear cover provides a majority of the flexural rigidity of the rear cover.

13. The apparatus of claim 12, wherein the chassis is composed of metal.

14. The apparatus of claim 12, wherein the outer layer includes polycarbonate.

15. The apparatus of claim 12, wherein the functional layer further includes a first stainless-steel stiffening layer and a second stainless-steel stiffening layer.

16. The apparatus of claim 15, wherein the second stainless-steel stiffening layer is electrically connected to the chassis.

17. An apparatus, comprising:
a mobile device, including:
- a midframe that has a recessed region;
- electronic components disposed in the chassis; and
- embedded in the recessed region, a rear cover, wherein the rear cover is laminated, wherein the rear cover is removable, wherein the rear cover is bonded to the chassis about an entire perimeter of the rear cover, wherein the rear cover has flexural rigidity, and wherein the rear cover includes:
  - an outer layer composed of a clear, scratch-resistant, RF-transparent material;
  - a cosmetic layer disposed beneath the outer layer that is RF-transparent and opaque; and
  - a functional layer that is disposed beneath the cosmetic layer, wherein the functional layer includes a first antenna layer, a first stainless-steel stiffening layer that includes integrated ferrite, and a second stainless-steel stiffening layer.

18. The apparatus of claim 17, wherein the midframe is composed of aluminum.

19. The apparatus of claim 17, wherein the outer layer includes polycarbonate.

20. The apparatus of claim 17, wherein the second stainless-steel stiffening layer is electrically connected to the chassis such that a Faraday cage is formed.

* * * * *